UNITED STATES PATENT OFFICE.

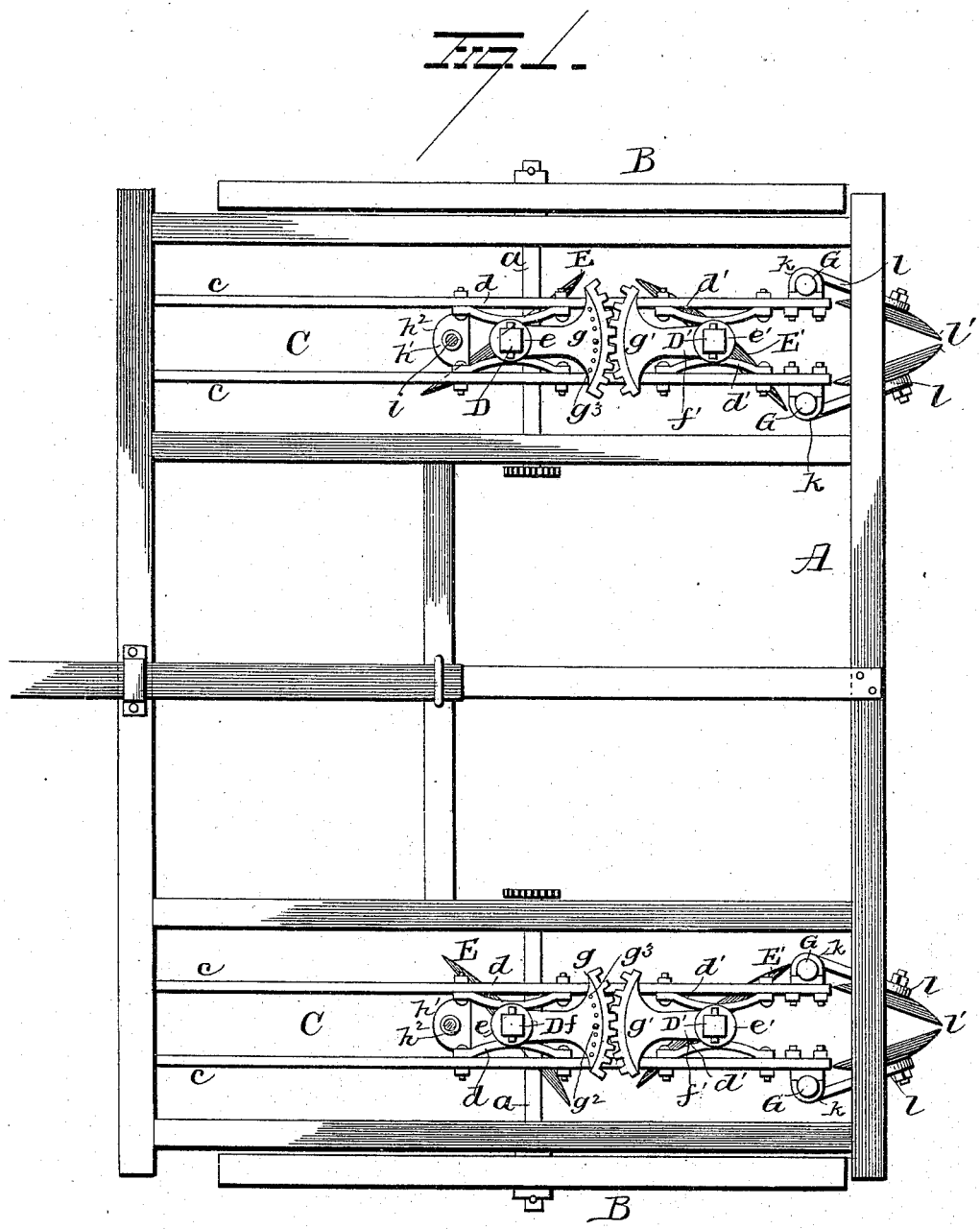

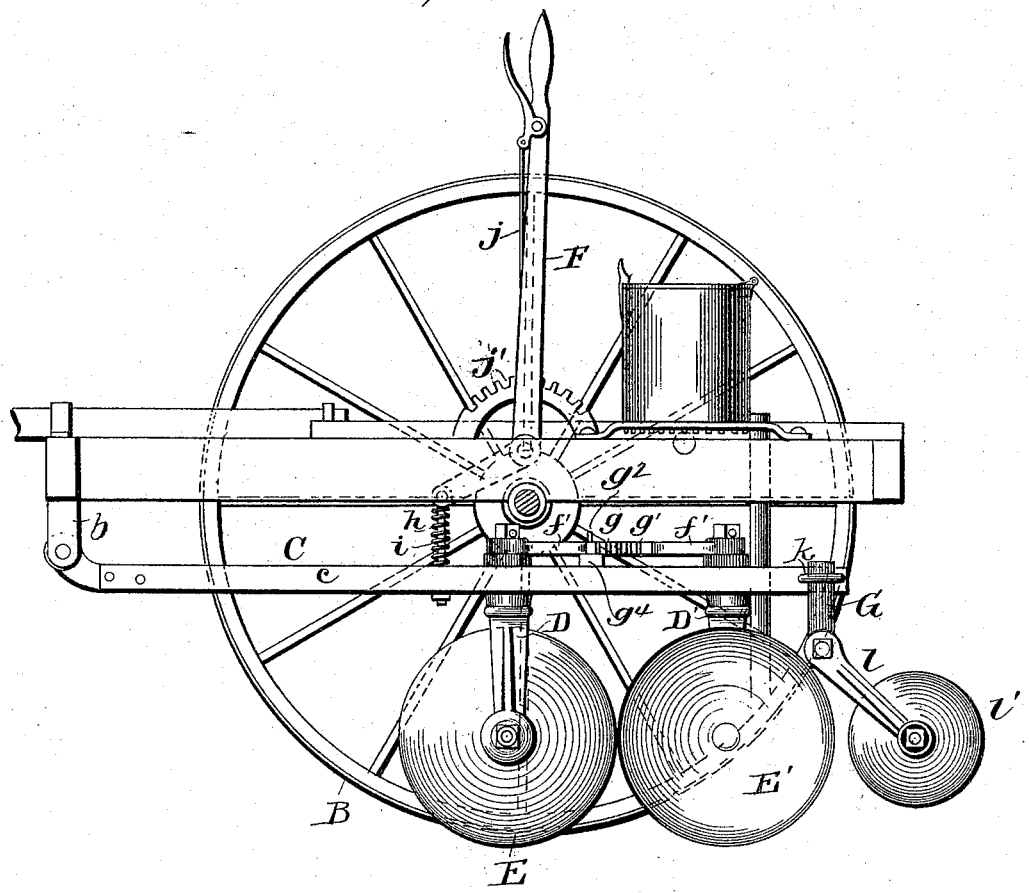

KIT C. HAWORTH, OF LIBERTY, INDIANA.

SEEDING-MACHINE.

SPECIFICATION forming part of Letters Patent No. 534,880, dated February 26, 1895.

Application filed March 19, 1894. Serial No. 504,273. (No model.)

*To all whom it may concern:*

Be it known that I, KIT CARSON HAWORTH, a citizen of the United States, residing at Liberty, in the county of Union and State of Indiana, have invented certain new and useful Improvements in Seeding-Machines; and I do hereby declare the following to be a full, clear, and exact description of the invention, such as will enable others skilled in the art to which it appertains to make and use the same.

My invention relates to an improvement in seeding machines, and more particularly to corn planters,—the invention being also adaptable for use for planting peas, beans, &c.

The object of the invention is to provide a machine of the class specified, with simple and efficient means for making the furrow into which the seed is to be deposited.

A further object is to so construct and arrange the devices which support the furrow disks or openers, that the latter can be readily set at different angles relatively to the line of draft of the machine and relatively to each other, whereby the width of the furrow can be easily regulated at will, and to so arrange the supporting devices of said disks that they can be readily raised and lowered.

A further object is to support the covering disks in such manner that they can be made to cover the seed deposited in the furrow with more or less soil, by raising or lowering the disks and by changing their angle to the furrow.

With these objects in view the invention consists in the combination with a frame, of two standards loosely mounted therein, one in advance of the other, and a furrow disk carried by each standard.

The invention also consists in the combination with a swinging frame, of standards loosely mounted therein, one in advance of the other, and adapted to be turned, and furrow disks carried by said standards.

The invention also consists in the combination with a frame, of a standard loosely mounted therein and adapted to be turned, a furrow disk carried by said standard and means for turning said standard to change the angle of the furrow disk.

The invention also consists in the combination with a frame, of standards mounted therein, one in advance of the other and adapted to be turned, a furrow disk carried by each standard, and a toothed segment carried by each standard and adapted to mesh with each other.

The invention also consists in the combination with a frame, of two furrow disks carried thereby, said furrow disks being disposed at an angle to the draft of the machine and at an angle to each other.

The invention also consists in the combination with a frame and furrow openers, of standards or supports adjustably connected to said frame and covering disks carried by said adjustable standards or supports.

The invention also consists in certain novel features of construction and combinations and arrangements of parts as hereinafter set forth and pointed out in the claims.

In the accompanying drawings: Figure 1 is a plan view illustrating my improvements. Fig. 2 is a side view.

A represents a main frame and B the main carrying wheels, the axles $a$ of said wheels being mounted on the frame A at each side thereof.

In the drawings I have shown, in Fig. 1, a machine provided with two sets of furrow opening and covering devices, and both sets of these devices being identical in construction, a detail description of one will suffice for both. It is evident that a one-horse machine can be built with but one set of such devices; that a three-horse machine may be provided with three sets and that any desired number of sets of devices may be employed, as desired.

Pivotally connected at one end to hangers $b$, secured to one end (the forward end) of the main frame A, is a swinging frame C, comprising two parallel bars $c, c$.

Between the bars of the frame C, brackets $d, d, d', d'$, are secured thereto and carry journal boxes $e, e'$ respectively, in which vertical standards D, D' are respectively mounted,— said standards being thus disposed, one directly in front of and in line with the other.

At the lower ends of the standards D, D', furrow disks E, E', are mounted and adapted to be normally disposed at an angle to the draft of the machine and at an angle to each other. With the furrow disks thus disposed, a clear furrow will be produced in the soil when the machine moves forward, but it may be desired that the furrow shall be wider at one time than at another and for this reason, the standards D, D' are revolubly mounted so that the angle of the disks can be changed relatively to the draft of the machine.

To provide simple and efficient means for changing the angle of the disks and to insure the simultaneous movement of the disks and the maintenance of the proper angle thereof relatively to each other, arms $f$, $f'$ are rigidly secured to the upper ends of the respective standards, and provided at their ends with toothed segments $g$, $g'$, which, at all times, intermesh, one with the other, so that when one standard is turned, the other will be turned in unison therewith and in the reverse direction. A pin $g^2$ will be passed through one of a series of perforations $g^3$ in the segment $g$ and a perforation in a cross bar $g^4$, to retain the segments at any desired adjustment.

In order to raise and lower the disks E, E' and regulate the depth of the furrow made by them, a lever F, is pivoted at a point between its ends to the main frame A, and connected with the swinging frame C by means of a rod $h$, said rod being pivotally connected to the end of the lever at one end and at the other end adapted to pass loosely through a perforation $h'$ made in a block $h^2$ on the frame C. A spring $i$ is made to encircle the rod $h$, bearing at one end against the block $h^2$ and at the other end against the lever. From this construction it will be seen that the lever F can be operated to raise the frame C so as to elevate the furrow disks above the ground, or it may be operated to force them more or less into the ground, thus regulating the depth of the proposed furrow.

In order to lock the frame C and the disks carried thereby in the position in which the same shall be adjusted, the lever F is provided with a spring actuated locking bar $j$ adapted to engage a segment $j'$ secured to the main frame A. The spring $i$ serves to permit the frame C and disks E, E' to yield when the latter strikes an obstruction.

To the rear ends of the bars $c$, $c$, of the swinging frame C, standards or supports G, G, are adjustably connected by means of loop-bolts $k$, or other suitable devices, and to the lower ends of said supports or standards, arms or brackets $l$ are pivotally connected, said arms or brackets normally projecting rearwardly and toward each other. At the free ends of the arms or brackets $l$, covering disks $l'$ are mounted, so that their concave sides will face each other. By this construction, the covering disks can be raised or lowered, whereby the seed may be covered any depth desired, and by adjustably connecting the standards or supports G to the frame C, I am enabled to change the angle of the covering disks to the furrow.

From the construction and arrangement of the furrow disks as above described, it will be seen that the concave face of one disk will throw the soil in one direction and the concave face of the other disk will throw it in an opposite direction, thereby making a perfect furrow for the reception of the seed.

It will also be observed that very simple and efficient means are provided for raising and lowering the furrow and covering disks and for regulating the width of the furrow as well as its depth and for covering the seed to a greater or less extent, as desired.

My improvements are all very simple in construction, easy to manipulate and effectual, in every respect, in the performance of their functions.

Various slight changes might be made in the details of construction of my invention without departing from the spirit thereof or limiting its scope and hence I do not wish to limit myself to the precise details of construction herein set forth, but, Having fully described my invention, what I claim as new, and desire to secure by Letters Patent, is—

1. In a seeding machine, the combination with a main frame, of a pair of standards axially supported and carrying furrow disks, said standards each provided with a toothed segment, the teeth of which intermesh, and means for locking one of said segments in different lateral positions whereby the axle of the disks may be varied, substantially as set forth.

2. In a seeding machine, the combination with a main frame, and a swinging frame pivotally connected therewith, of a pair of standards, capable of turning axially supported in said frames, said standards carrying wheels and each provided with a toothed segment, the teeth of which intermesh with each other, one segment provided with holes and a pin adapted to enter one of the holes to hold the segment in locked position, substantially as set forth.

3. In a seeding machine, the combination with a main frame, and a swinging frame hinged thereto, of a pair of covering wheels, standards capable of axial adjustment relative to the swinging frame, and arms hinged to the standards to which these disks are connected, substantially as set forth.

4. In a seeding machine, the combination with a main frame, swinging frames hinged thereto, and lever mechanism for raising and lowering said swinging frames, of furrow wheels supported by the swinging frames and capable of axial adjustment relative thereto, and covering wheels axially adjustable relative to the swinging frames, substantially as set forth.

In testimony whereof I have signed this specification in the presence of two subscribing witnesses.

K. C. HAWORTH.

Witnesses:
 F. F. FOSDICK,
 J. M. COUGHLIN.